United States Patent Office.

JOHN GREACEN, JR., OF NEW YORK, N. Y.

Letters Patent No. 114,287, dated May 2, 1871.

IMPROVEMENT IN THE MANUFACTURE OF RUBBER.

The Schedule referred to in these Letters Patent and making part of the same.

*To all whom it may concern:*

Be it known that I, JOHN GREACEN, Jr., of the city, county, and State of New York, have invented a new and useful Improvement in the Manufacture of Rubber.

The object of this invention is to combine with India rubber, in the process of manufacturing, wood pulp for the purpose of giving to the rubber body, stiffness, and toughness, and at the same time cheapen the manufacture of rubber material.

To enable others skilled in the art to make and use my improvement, I proceed to describe my invention as follows:

After the rubber has been broken down and reduced to the proper consistency in the usual manner, I combine with the "batch" thus formed, wood pulp, intimately mixing and combining by grinding or otherwise the rubber and wood pulp together, (the relative proportions depending upon the purposes for which the product is required,) until a homogeneous mass is produced of the required consistency, which, after going through the ordinary process of curing, calendering, &c., forms a new article of manufacture, particularly adapted to making packing or belting and all surfaces subject to friction, or to any purpose where less elasticity and more body or firmness is required.

The above-described compound is understood to apply to soft-rubber manufacture only, and in no wise to be mistaken for any hard-rubber compound; nor is it to be compounded with inventions heretofore made for combining with rubber fibrous materials, to which I make no claim, and from which my invention differs in the fact that the more intimately the wood-pulp of my admixture is ground so as to destroy all fiber the better it will suit the purpose of my product and invention; therefore,

What I claim as new, and desire to secure by Letters Patent, is—

The India-rubber compound herein described, composed of wood pulp and rubber, in the manner and for the purposes hereinbefore described.

JOHN GREACEN, JR.

Witnesses:
 H. L. WATTENBERG,
 G. M. PLYMPTON.